Dec. 11, 1956    S. GORWITZ    2,773,323
DISC FOR FILM SLIDES
Filed May 12, 1951

Inventor
SAM GORWITZ

By Gerald P. Welch
Attorney

United States Patent Office 2,773,323
Patented Dec. 11, 1956

2,773,323

DISC FOR FILM SLIDES

Sam Gorwitz, Oshkosh, Wis.

Application May 12, 1951, Serial No. 226,080

1 Claim. (Cl. 40—70)

This invention relates to improvements in discs for film slides or transparencies, and more particularly to a novel composite circular disc for film slides.

In the use of a circular disc having means for retaining film slides about its periphery, devices of the type provide for planar placement relation of the slides in the discs. It is an object of the invention to provide a disc which will accommodate a relatively larger number of slides than is possible in discs heretofore made of comparable size.

Other and further objects of the invention will appear as the description proceeds, reference being had to the accompanying drawing, in which.

Figure 1:
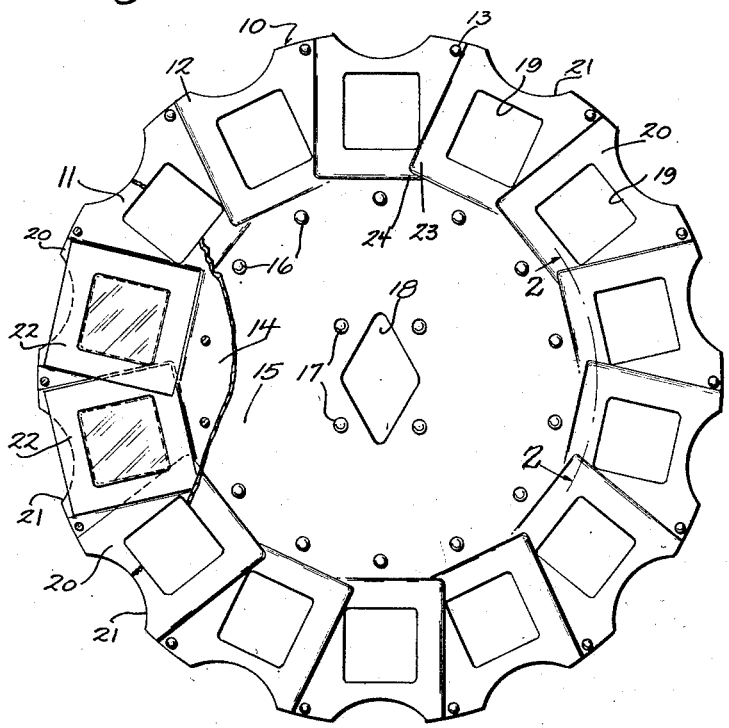
Fig. 1 is a plan view partially broken away of the disc embodying the invention.
Figure 4:
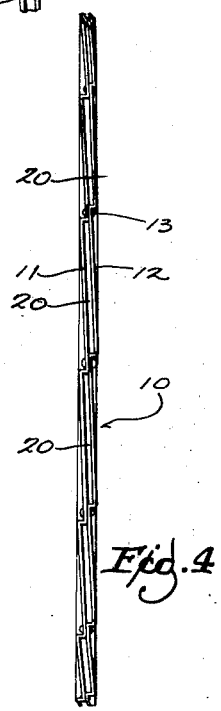
Fig. 4 is an edge view in elevation of the disc.

Referring more particularly to the drawing, the numeral 10 refers to the composite disc generally formed of two plates 11 and 12 secured together by rivet or other means 13. The central portions 14 and 15 of the discs 11 and 12 are held in close proximity by a circular row of rivets 16 and the rivets 17 adjoining the central portion thereof which has a diamond shaped aperture at 18 adapted for engagement with appropriate rotating means in a projection machine. The plates 11 and 12 are plurally apertured adjacent their periphery in registry as at 19 and the said plates are pressed to provide a plurality of overlapping slide compartments 20, open edgedly as at 21 to receive the slide 22. In Fig. 1 it is apparent that the left hand portion of each compartment at its inner end, as at 23, overlaps the inner right hand corner 24 of its adjacent compartment to the left. As shown in Fig. 1 the slides 22 overlap marginally with the result that more slides can be inserted in a composite disc having overlapping compartments than can be inserted or held in a disc of conventional construction.

Figure 3:
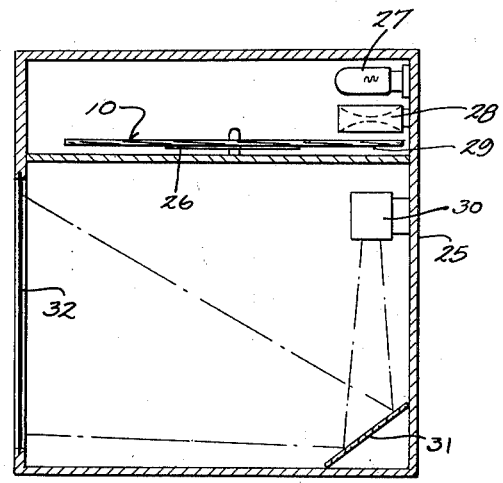
Fig. 3 is a vertical sectional view taken through a film viewing cabinet provided with a composite disc embodying the invention.
Figure 2:
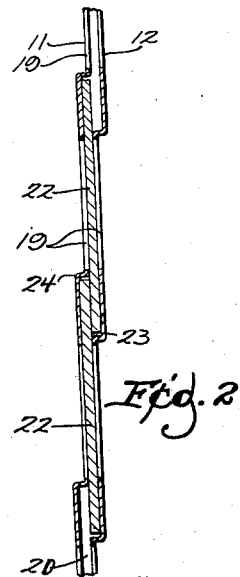
Fig. 2 is a sectional view taken on line 2—2 of Fig. 1.

In use, the film slides 22 are inserted edgedly at 21 of the several compartments 20 and the disc 10 is then prepared for insertion into a projecting machine for viewing of said slides. In Fig. 3 a machine 25 is shown in which the slide 10 is placed on a turntable 26. A source of light 27 is projected downwardly through lenses 28 through a slide at 29 through a second lens at 30 onto the mirror 31 and then to the screen 32.

It will be understood that the device is capable of many modifications in structure and design, without departing from the spirit of the invention, within the scope of the appended claim.

Having thus described the invention, what is claimed and desired to be secured by Letters Patent of the United States, is:

A composite circular disc for film slides comprising a pair of plates fastened together and having opposed rectangular depressions to provide a plurality of edge-accessible flat film slide compartments about its periphery whereby any one compartment overlaps into the next adjoining slide compartment up to the edges of registering apertures formed in said plates, the said plates being apertured in registry to conform to the transparent portions of film slides to be held in said compartments.

References Cited in the file of this patent

UNITED STATES PATENTS

| | | |
|---|---|---|
| 1,600,719 | Davis | Sept. 21, 1926 |
| 1,714,159 | Crawford | May 21, 1929 |
| 1,725,976 | Canode | Aug. 27, 1929 |
| 1,901,245 | Jones | Mar. 14, 1933 |
| 2,336,742 | Maguire | Dec. 14, 1943 |
| 2,505,506 | Sayre | Apr. 25, 1950 |